US012592643B2

(12) United States Patent
Kankanala et al.

(10) Patent No.: US 12,592,643 B2
(45) Date of Patent: Mar. 31, 2026

(54) POWER ADAPTER POWER DELIVERY

(71) Applicant: Cypress Semiconductor Corporation, San Jose, CA (US)

(72) Inventors: Ramesh Kankanala, Bangalore (IN); Ramakrishna Venigalla, Bangalore (IN); Shaon Mazumder, Bangalore (IN); Amrit Kumar Jit, Mayurbhanj (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 191 days.

(21) Appl. No.: 18/523,658

(22) Filed: Nov. 29, 2023

(65) Prior Publication Data

US 2025/0175084 A1 May 29, 2025

(51) Int. Cl.
*H02M 3/335* (2006.01)
*H02M 1/08* (2006.01)

(52) U.S. Cl.
CPC ............. *H02M 3/335* (2013.01); *H02M 1/08* (2013.01)

(58) Field of Classification Search
CPC ......... H02M 3/33507; H02M 3/33523; H02M 3/1582; H02M 3/158; H02M 3/07; H02M 3/156; H02M 3/33592; H02M 3/155; H02M 3/335; H02M 3/33561; H02M 3/1588; H02M 3/285; H02M 3/1584; H02M 3/33515; H02M 1/08; H02M 1/10; H02M 1/0095; H02J 7/007; H02J 7/02
See application file for complete search history.

(56) References Cited

U.S. PATENT DOCUMENTS

| | | | | |
|---|---|---|---|---|
| 11,740,672 B2 * | 8/2023 | Lin | ...................... | G06F 13/4282 |
| | | | | 307/82 |
| 2021/0152073 A1 * | 5/2021 | Akahane | ............. | H02M 1/0006 |
| 2022/0350388 A1 * | 11/2022 | Lin | ......................... | G06F 1/266 |

* cited by examiner

*Primary Examiner* — Bryan R Perez

(57) ABSTRACT

In an embodiment, a method for operating a USB-PD power adaptor comprises operating a first buck circuit comprising a first switch connected between a supply voltage terminal and a first USB port based on a first target voltage and a supply voltage at the supply voltage terminal, responsive to the first target voltage being less than the supply voltage plus an offset voltage, operating the first buck circuit in a variable-buck-input mode to control the first switch according to a first duty cycle based on the first target voltage and the supply voltage to generate the first target voltage at the first USB port, and responsive to the first target voltage being equal to the supply voltage plus the offset voltage, operating the first buck circuit in a buck-bypass mode to maintain an on state of the first switch to generate the first target voltage at the first USB port.

20 Claims, 7 Drawing Sheets

POWER ADAPTER POWER DELIVERY

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) source at a specified voltage level.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a universal serial bus power delivery (USB-PD) power adaptor comprises a first USB port, a flyback-converter operable to receive and convert a first voltage to a second voltage, a first buck circuit comprises a first switch connected between the flyback-converter and the first USB port, and a USB-PD controller connected to the flyback-converter and configured to receive a first target voltage for the first USB port, determine a value for the second voltage of the flyback converter, responsive to the first target voltage being less than the second voltage plus an offset voltage, operating the first buck circuit in a variable-buck-input mode to control the first switch according to a first duty cycle based on the first target voltage and the second voltage to generate the first target voltage at the first USB port, and responsive to the first target voltage being equal to the second voltage plus the offset voltage, operating the first buck 0circuit in a buck-bypass mode to maintain an on state of the first switch to generate the first target voltage at the first USB port.

In an embodiment of the techniques presented herein, a system for operating a universal serial bus power delivery (USB-PD) power adaptor comprises means for operating a first buck circuit comprising a first switch connected between a supply voltage terminal and a first USB port based on a first target voltage for the first USB port and a supply voltage at the supply voltage terminal, wherein responsive to the first target voltage being less than the supply voltage plus an offset voltage, means for operating the first buck circuit in a variable-buck-input mode to control the first switch according to a first duty cycle based on the first target voltage and the supply voltage to generate the first target voltage at the first USB port, and responsive to the first target voltage being equal to the supply voltage plus the offset voltage, operating the first buck circuit in a buck-bypass mode to maintain an on state of the first switch to generate the first target voltage at the first USB port.

In an embodiment of the techniques presented herein, a method for operating a universal serial bus power delivery (USB-PD) power adaptor comprises operating a first buck circuit comprising a first switch connected between a supply voltage terminal and a first USB port based on a first target voltage for the first USB port and a supply voltage at the supply voltage terminal, wherein responsive to the first target voltage being less than the supply voltage plus an offset voltage, operating the first buck circuit in a variablebuck-input mode to control the first switch according to a first duty cycle based on the first target voltage and the supply voltage to generate the first target voltage at the first USB port, and responsive to the first target voltage being equal to the supply voltage plus the offset voltage, operating the first buck circuit in a buck-bypass mode to maintain an on state of the first switch to generate the first target voltage at the first USB port.

In an embodiment of the techniques presented herein, a universal serial bus power delivery (USB-PD) power adaptor comprises USB ports, a flyback-converter operable to receive and convert a first voltage to a second voltage, buck circuits connected between the flyback-converter and the USB ports, and a USB-PD controller connected to the flyback-converter and configured to receive target voltages for the USB ports, determine a value for the second voltage of the flyback converter based on a greatest of the target voltages, responsive to a target voltage for a first selected buck circuit of the buck circuits being less than the second voltage plus an offset voltage, operating the first selected buck circuit in a variable-buck-input mode according to a duty cycle based on the target voltage for the first selected buck circuit and the second voltage to generate the target voltage for the first selected buck circuit at a first USB port of the USB ports associated with the first selected buck circuit, and responsive to a target voltage for a second selected buck circuit of the buck circuits being less than the second voltage plus the offset voltage, operating the second selected buck circuit in a buck-bypass mode according to a duty cycle of 100% to generate the target voltage for the second selected buck circuit at a second USB port of the USB ports associated with the second selected buck circuit.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
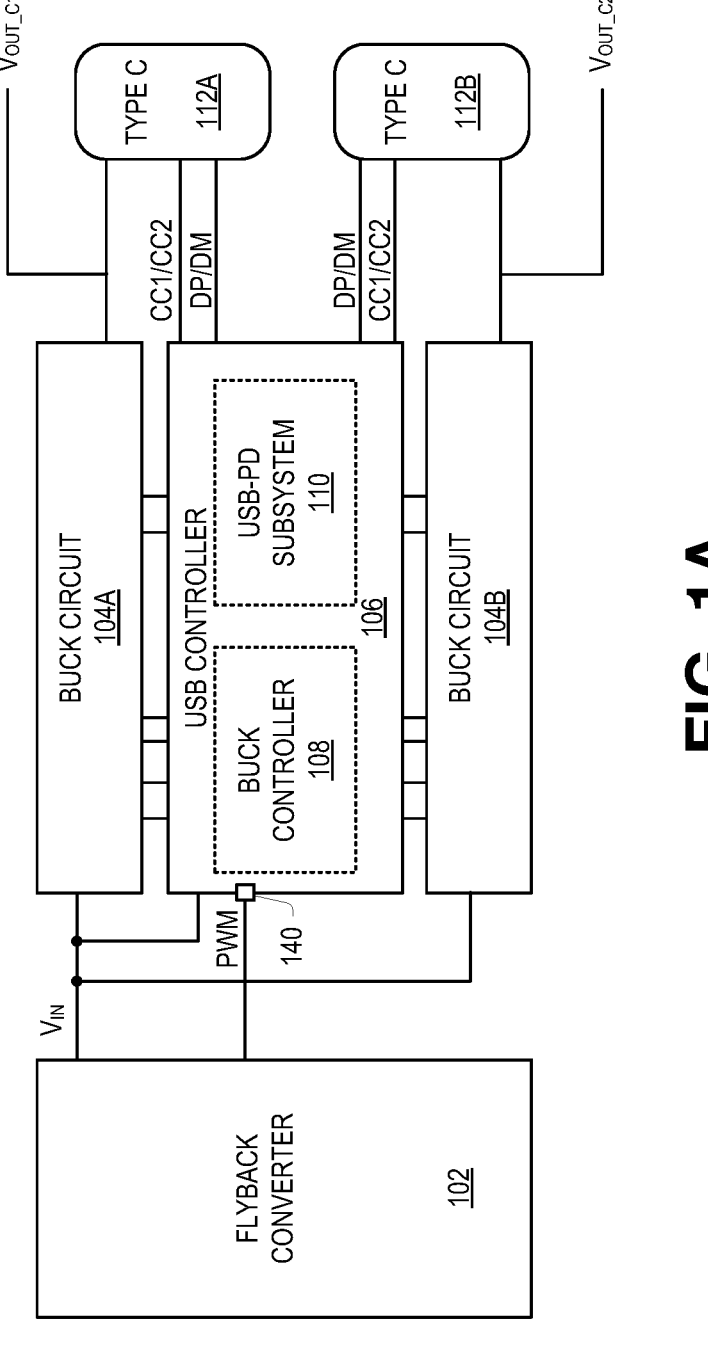
FIG. 1A is a block diagram illustrating a multiport universal serial bus (USB) power delivery (USB-PD) power adaptor, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

FIG. 1A is a block diagram of an embodiment of a multiport USB power adaptor 100 including a flyback converter 102, buck circuits 104A, 104B, and a USB controller 106, including a buck controller 108 and a USB-PD subsystem 110. The buck controller 108 can be integrally formed in the USB controller 106 (also referred to as USB-PD controller), as shown, as part of a DC/DC-controller or subsystem, or the buck controller 108 can be external to the USB controller 106. In some embodiments, the multiport USB power adaptor 100 comprises two USB ports 112A, 112B corresponding to the buck circuits 104A, 104B, however, any number of USB ports and buck circuits 104A, 104B may be provided. Each of the USB ports 112A, 112B is connected to an output of the flyback converter 102 through one of the buck circuits 104A, 104B and to the USB controller 106 through one or more CC lines and DP/DM lines.

The flyback converter 102 is configured to receive and convert an input AC or DC voltage to a second DC voltage. Each of the buck circuits 104A, 104B connected between a supply voltage terminal of the flyback converter 102 and one of the USB ports 112A, 112B is configurable by the buck controller 108 to receive an input voltage ($V_{IN}$) from the flyback converter 102 at the supply voltage terminal and to output a target voltage ($V_{OUT\_C1}$, or $V_{OUT\_C2}$) to one of the USB ports 112A, 112B. More specifically, the buck controller 108 is operable to independently control each of the buck circuits 104A, 104B, to provide the requested or targeted $V_{OUT\_C1}$ or $V_{OUT\_C2}$ on the associated USB port 112A, 112B. In some embodiments, the output voltages $V_{OUT\_C1}$ and $V_{OUT\_C2}$ need not be the same, and both of the USB ports 112A, 112B need not be active with a device connected to the USB port 112A, 112B, at the same time. The USB controller 106 is coupled to the flyback converter 102, the buck circuits 104A, 104B, and to the USB ports 112A, 112B. The USB-PD subsystem 110 in the USB controller 106 is configured to control or operate the flyback converter 102, and, in cooperation with the buck controller 108, to operate the multiport USB power adaptor 100 in a variable-buck-input mode or a buck-bypass mode.

In variable-buck-input mode, the USB-PD subsystem 110 controls the flyback converter 102 to generate an input voltage ($V_{IN}$) into the buck circuits 104A, 104B, determined by an offset voltage ($V_{OS}$) and the higher of a highest requested output voltage ($V_{OUT\_C1}$, or $V_{OUT\_C2}$) or a voltage determined from a power drawn on both ports in watts ($W_{C1}$, $W_{C2}$) relative to a maximum current ($I_{max}$) supported by the multiport USB power adaptor 100. If only one of the USB ports 112A is active or connected to a first device, the USB-PD subsystem 110 operates the flyback converter 102 to generate a $V_{IN}$ equal to a sum of $V_{OS}$ and the requested $V_{OUT\_C1}$. If the second USB port 112B is also connected to a second device, the USB-PD subsystem 110 operates the flyback converter 102 to generate and couple to the first and second buck circuits 104A, 104B, a $V_{IN}$ equal to a sum of $V_{OS}$ and a greater of $V_{OUT\_C1}$, or $V_{OUT\_C2}$, and the buck circuits 104A, 104B are enabled and operated to output $V_{OUT\_C1}$ to the first USB port 112A and $V_{OUT\_C2}$ to output to the second USB port 112B.

In buck-bypass mode with a single USB port 112A active the USB-PD subsystem 110 of the USB controller 106 controls the flyback converter 102 to generate a $V_{IN}$ equal to $V_{OUT\_C1}$ which is passed to the first USB port 112A by configuring the first buck circuit 104A in buck-bypass mode. If the second USB port 112B is also connected to a second device, the USB-PD subsystem 110 operates the flyback converter 102 to generate and couple to the first and second buck circuits 104A, 104B a $V_{IN}$ equal to a greater of $V_{OUT\_C1}$, $V_{OUT\_C2}$ or a voltage determined from a power drawn on both ports in watts ($W_{C1}$, $W_{C2}$) relative to a maximum current ($I_{max}$) supported by the multiport USB adaptor 100. The buck circuit 104A, 104B associated with the USB port 112A, 112B requesting the lower output voltage ($V_{OUT\_C1}$ or $V_{OUT\_C2}$) is then operated in variable-buck-input mode to generate the requested, lower output voltage. If both USB ports 112A, 112B are connected to devices and have the same requested voltage, $V_{IN}$ is set equal to $V_{OUT\_C1}/V_{OUT\_C2}$ plus $V_{OS}$ and both buck circuits 104A, 104B are operated in buck-bypass mode.

In some embodiments, the requested output voltages ($V_{OUT\_C1}$ or $V_{OUT\_C2}$) can include one of 5V, 9V, 12V, 15V or 20V (e.g., in accordance with a USB-PD specification). The offset voltage ($V_{OS}$), where applicable, compensates for an expected voltage drop across the buck circuits 104A, 104B and is generally dependent on a maximum duty cycle of the buck circuit 104A, 104B. For example, if the offset voltage, $V_{OS}$, is 1V, $V_{IN}$ in variable-buck-input mode can include 6V, 10V, 13V, 16V or 21V.

Figure 1B:
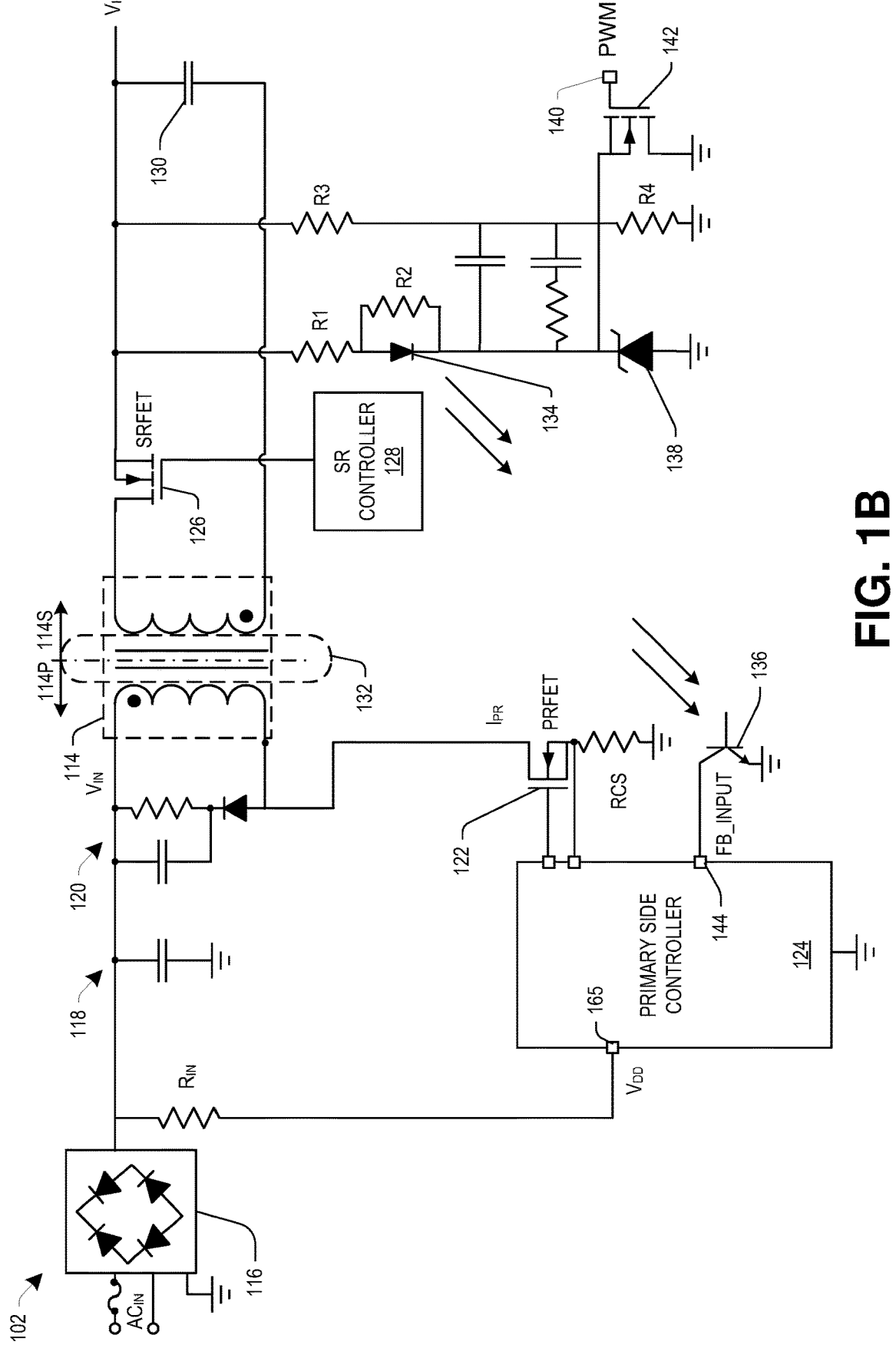
FIG. 1B is a schematic block diagram of a flyback converter, in accordance with some embodiments.

An embodiment of the multiport USB power adaptor 100 will now be described in greater detail with reference to FIG. 1B. FIG. 1B is a schematic diagram illustrating an embodiment of the USB power adaptor of FIG. 1A. In the embodiment shown the multiport USB power adaptor 100 is a dual-port USB power adaptor including first and second USB Type-C ports 112A, 112B, and an AC-DC flyback converter 102.

FIG. 1B is a schematic and block diagram of the flyback converter 102, in accordance with some embodiments. In some embodiments, the flyback converter 102 comprises a transformer 114 having a primary winding on a primary side 144P electrically connected or coupled to an input, and a secondary winding on a secondary side 114S coupled to an output. On the primary side 114P, a rectifying circuit, such as a bridge rectifier 116, and one or more input filters 118, 120 are connected to a first terminal of the transformer 114 to rectify an AC input voltage, $AC_{IN}$, and supply input power to the primary winding of the transformer 114. The flyback converter 102 further includes a power switch (PS 122), such as a primary field effect transistor (PRFET), having a drain node coupled to a second terminal of the transformer 114, a gate node coupled to a primary side controller 124, and a source node coupled to the primary side controller and, through a current sensing element, such as a resistive element (RCS), to ground to sense a primary side current ($I_{PR}$) flowing through the primary winding when the PS 122 is closed or conducting. In some embodiments, the primary side controller 124 is further connected to the first terminal of the transformer 114 through a resistive element ($R_{IN}$) to receive a voltage or signal equal or proportional to the rectified AC input voltage.

On the secondary side 114S the flyback converter 102 includes a synchronous rectifier (SR), such as a SR field effect transistor (SRFET) 126, an SR controller 128 coupled to a gate of the SRFET 126 and an output capacitor 130. The flyback converter 102 further includes an isolation circuit or barrier 132 to electrically isolate the secondary side 114S from the AC input voltage present on the primary side 114P. Because the transformer 114 is a step down transformer it is considered part of the isolation barrier 132. The isolation barrier 132 further includes an opto-isolator 134 to provide electrical isolation on a flyback or feedback path from the USB-PD subsystem 110 of the USB controller 106 and the primary side controller 124. In some embodiments, the opto-isolator 134 includes a light emitting element, such as a light emitting diode (LED), and a light sensitive element 136, such as a phototransistor. The opto-isolator 134 has an anode coupled to the drain of the SR_FET 126 through a first voltage divider including a first resistive element R1 and a second resistive element R2, and a cathode coupled to ground through a shunt regulator 138. The cathode of the opto-isolator 134 and the shunt regulator 138 are further coupled to a feedback (FB) pin 140 of the of the USB controller 106 through a second voltage divider including resistive elements R3 and R4, and through an enhancement mode n-channel transistor 142 to receive a pulse width modulated (PWM) feedback signal, which enables secondary side control of the flyback converter 102. The light sensitive element 136 can include a bipolar NPN transistor, and is coupled to the primary side controller 124 through an FB_INPUT pin 144. Alternatively, the shunt regulator 138, the transistor 142, and the resistors R3, R4 may integrated in USB-PD subsystem 110 of the USB controller 106, and, for some highly integrated flyback controller designs, the USB controller 106 can control the flyback converter 102 through a digital interface such as an Inter-Integrated Circuit (I2C), or Serial Peripheral Interface (SPI). In some embodiments, PWM signal can be communicated between the SR controller 128 and the primary-side controller 124 using a pulse transformer that communicates PWM signals electromagnetically, with the pulse transformer providing an isolation barrier.

In operation the SR controller 128 senses voltage on the SR_DRAIN and turns the SRFET 126 on and off in response to sensed voltage peaks, and negative and zero-crossings. The primary side controller 124 receives a signal from the SR_FET 126 or SR controller 128 over a feedback or flyback path. During the time in which the PS 122 is on or closed with the SR_FET 126 being off or open, the flyback converter 102 is said to be operating in fly-back mode, and a magnetic field builds up in the transformer 114 while a current on the primary side 114P increases linearly. When the PS 122 is off or opened, and the SR_FET 126 is on or closed, the flyback converter 102 transfers the power to the secondary side 114S, in which the magnetic field begins to collapse and the secondary side current decreases steadily, but gradually as power is transferred to the output capacitor 130 connected to the output until a point is reached at which there is zero current flow in the secondary side 114S.

Figure 1C:
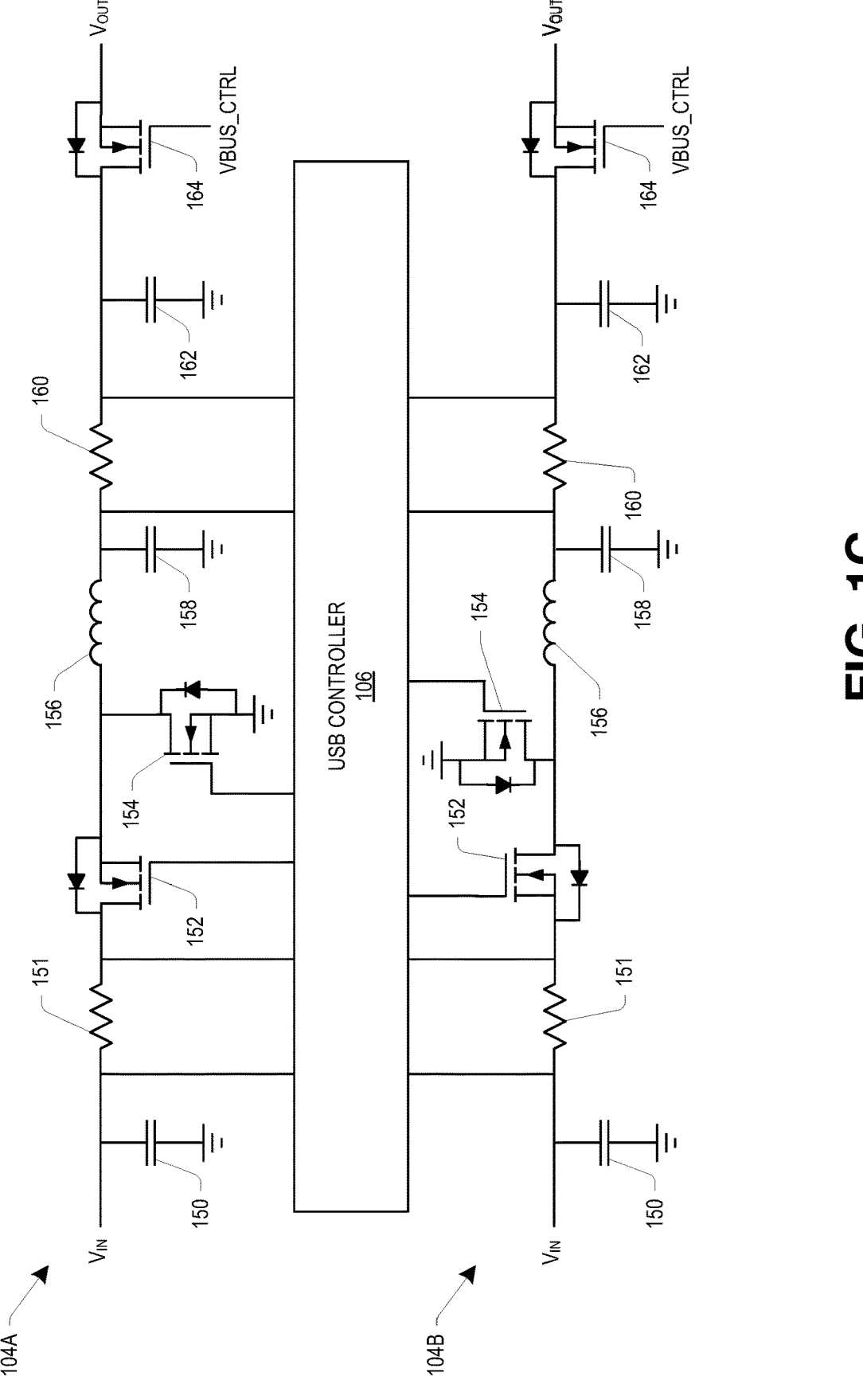
FIG. 1C is a schematic block diagram of a buck circuit in a USB power adaptor, in accordance with some embodiments.

FIG. 1C is a schematic diagram illustrating an embodiment of the buck circuits 104A, 104B, according to some embodiments. Each buck circuit 104A, 104B comprises an input capacitor 150, an input resistor 151, a first switching element 152, a second switching element 154, an inductor 156, a capacitor 158, a current sense resistor 160, and an output capacitor 162. In some embodiments, a provider transistor 164 is provided that uses a VBUS_CTRL signal for controlling slew rate for the buck circuit 104A, 104B.

In variable-buck-input mode, the USB controller 106 is operated to switch the buck circuit 104A, 104B between a mode that stores energy in the inductor 156 while the capacitor 158 supplies the output and one that releases that stored energy to recharge the capacitor 158. When the switching element 152 is on and the switching element 154 is off, energy is stored in the inductor 156. When the switching element 152 is off and the switching element 154 is on, energy is sent to the capacitor 158 to generate the output voltage. The PWM duty cycle of the buck circuit 104A, 104B is determined based on a ratio of the output voltage to the input voltage.

In buck-bypass mode, the USB controller 106 is operated to maintain the on state of the switching element 152 and the off state of the switching element 154 to charge the output capacitor 158 with the input voltage $V_{IN}$ to generate the output voltage. In some embodiments, the on state of the switching element 152 is maintained by setting the PWM duty cycle to 100%. In some embodiments, a bootstrap circuit, such as a charge pump generates a bootstrap signal to maintain the on state of the switching element 152.

Figure 2:
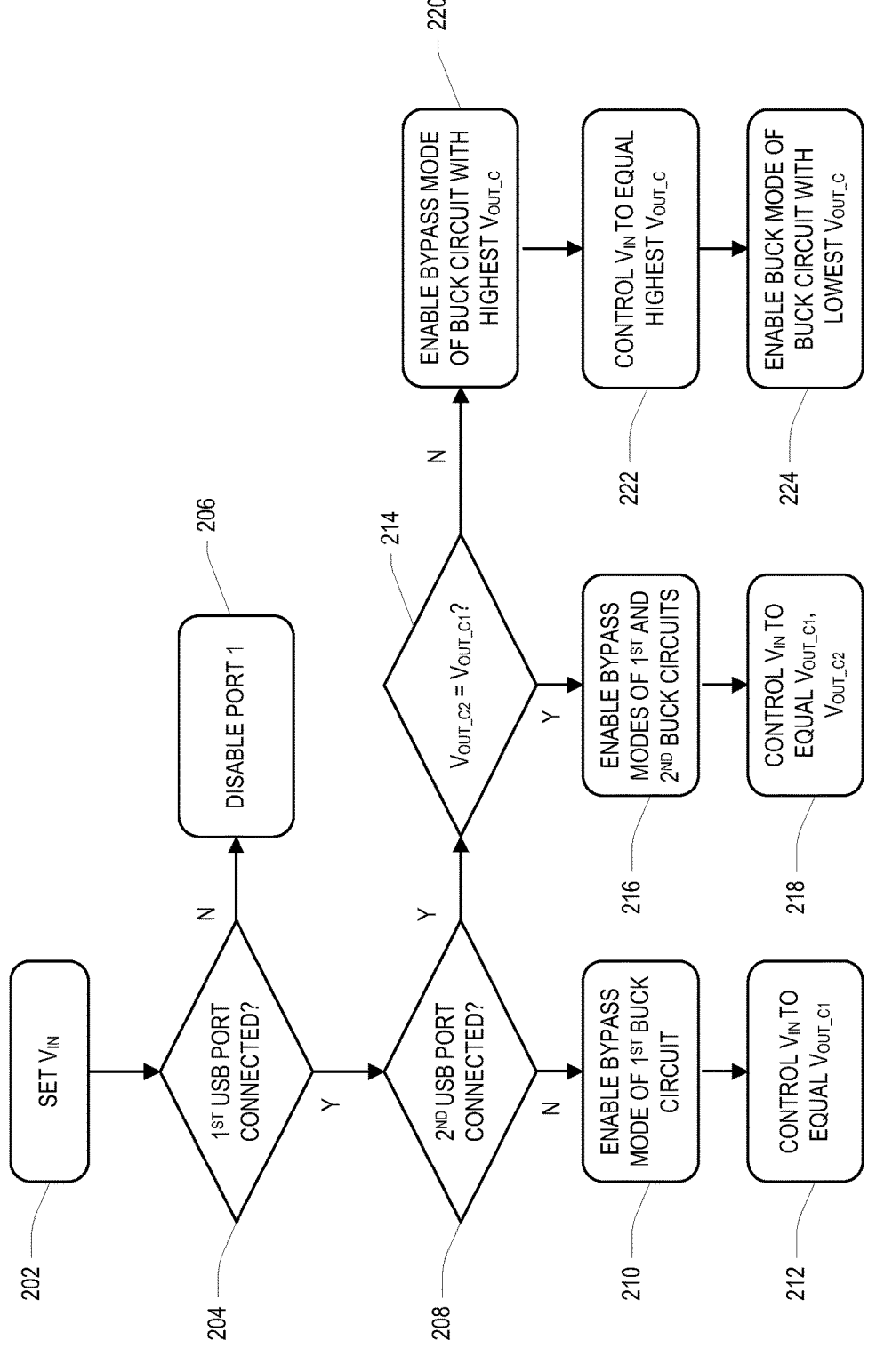
FIG. 2 is a flowchart illustrating a method of operating a USB power adaptor in a buck-bypass mode, in accordance with some embodiments.

FIG. 2 is a flowchart illustrating a method 200 of operating a USB power adaptor in a buck-bypass mode of operation, in accordance with some embodiments. The USB controller 106 operates the buck circuits 104A, 104B according to contracts established with load devices on the USB ports 112A, 112B. At 202, the input voltage, $V_{IN}$, for the flyback converter 102 is set. In some embodiments, $V_{IN}$ is set to a lowest supported output voltage from one of the multiple USB ports 112A, 112B, such as $V_{IN}$=5V, for example. In some embodiments, supported output voltages can include 5V, 9V, 12V, 15V or 20V (e.g., in accordance with a USB-PD specification). At 204, a determination is made as to whether at least a first USB port 112A of the multiple USB ports 112A, 112B is active (i.e., is whether a device is connected to the first USB port 112A. If no device is detected at 204, the USB port 112A is disabled at 206. If a device is connected at 204, a determination is the made at 208 as to whether a second USB port 112B of the multiple USB ports 112A, 112B is active, and has a device connected thereto. If the second USB port 112B is not active at 208, the USB-PD subsystem 110 enables bypass mode of the buck circuit 104A at 210 and controls $V_{IN}$ to equal the target voltage $V_{OUT\_C1}$ for the first USB port 112A at 212.

If a second device is detected connected to a second USB port 112B at 208, a determination is made at 214 as to whether the requested or target voltage $V_{OUT\_C2}$ requested for the second USP port 112B is the same as the target voltage $V_{OUT\_C1}$ for the first USB port 112A. If the requested or target voltages $V_{OUT\_C2}$ and $V_{OUT\_C1}$ are the same at 214, the USB-PD subsystem 110 enables bypass modes of both of the buck circuits 104A, 104B at 216 and controls $V_{IN}$ to equal the target voltage $V_{OUT\_C1}$, $V_{OUT\_C2}$ for the USB ports 112A, 112B at 218.

If the requested or target voltages $V_{OUT\_C2}$ and $V_{OUT\_C1}$ are not the same at 214, the USB-PD subsystem 110 enables the bypass modes of the buck circuit 104A, 104B with the highest target $V_{OUT\_C}$ at 220 and controls $V_{IN}$ to equal the highest target voltage $V_{OUT\_C}$ at 222. The USB-PD subsystem 110 enables the buck mode of the buck circuit 104A, 104B with the lowest target $V_{OUT\_C}$ at 224.

Figure 1D:
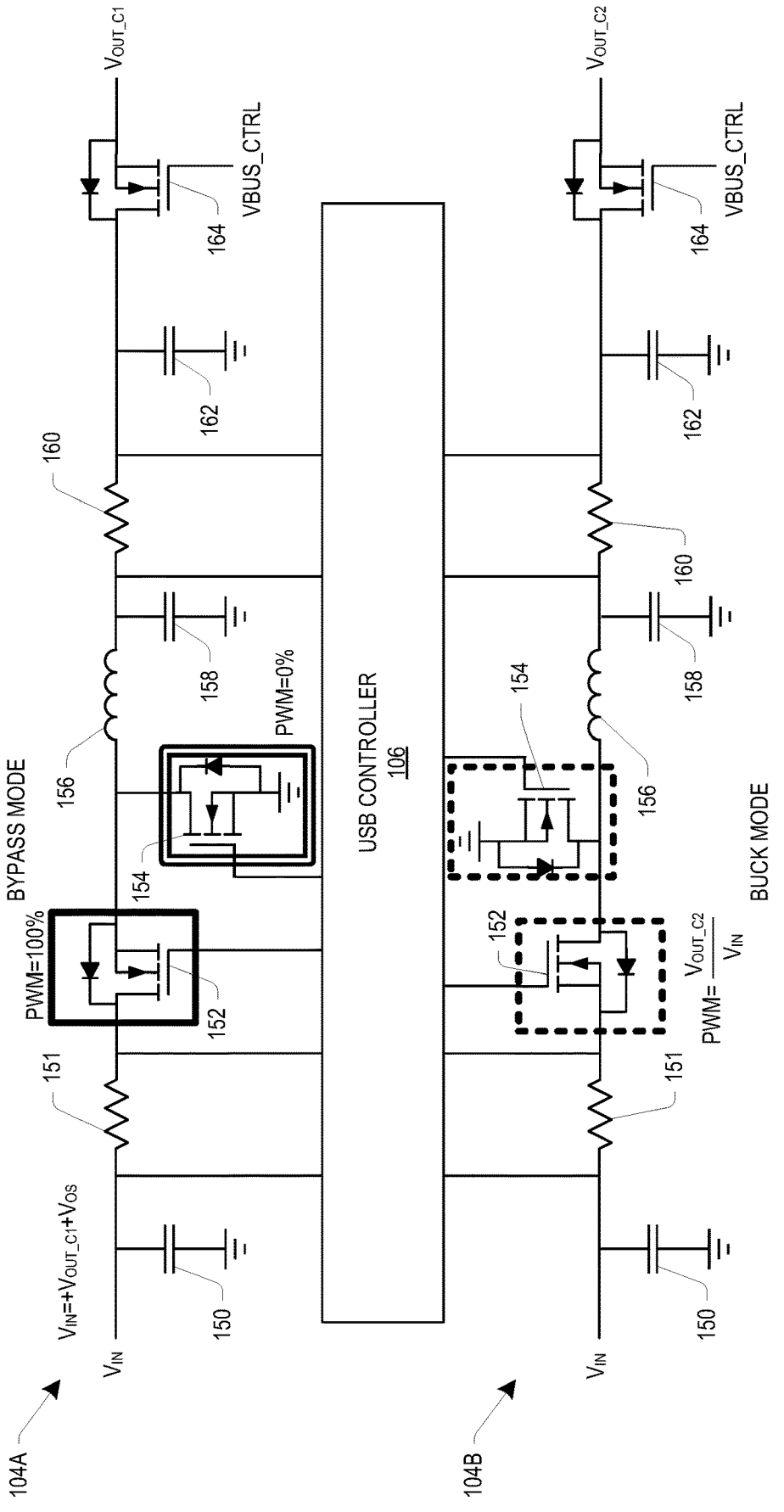
FIG. 1D is a schematic block diagram of a first buck circuit operated in buck-bypass mode and a second buck circuit operated in variable-buck-input mode, in accordance with some embodiments.

FIG. 1D illustrates the buck circuit 104A operating in buck-bypass mode and the buck circuit 104B operating in variable-buck-input mode. In the buck circuit 104A, the PWM of the switching element 152 is set to 100% (designated by solid line) and the PWM of the switching element 154 is set to zero (designated by double line). The input voltage generated by the flyback converter 102 is set to $V_{IN} = V_{OUT\_C1} + V_{OS}$. In the buck circuit 104B, the PWM of the switching element 152 is set to PWM=$V_{OUT\_C2}/V_{IN}$ (designated by dashed line).

The method 200 in FIG. 2 may be scaled for any number of buck circuits 104A, 104B and associated USB ports 112A, 112B. The USB-PD subsystem 110 sets $V_{IN}$ to equal the highest target voltage $V_{OUT\_C}$ across all the active USB ports 112A, 112B and enables the bypass modes of the buck circuits 104A, 104B having that highest target $V_{OUT\_C}$. The USB-PD subsystem 110 enables the buck modes of the buck circuits 104A, 104B for any of the USB ports 112A, 112B having lower requested or target voltages.

In some embodiments, the USB-PD subsystem 110 uses a feedback loop or mechanism that monitors the output voltages ($V_{OUT\_C1}$, $V_{OUT\_C2}$) and load currents ($I_{out\_C1}$, $I_{out\_C2}$) relative to a maximum current ($I_{max}$) supported by the multiport USB power adaptor 100 and switches operation between buck-bypass mode and variable-buck-input mode depending on the total wattage drawn on the USB ports 112A, 112B. When the total current drawn on the USB ports 112A, 112B is small relative to $I_{max}$ the multiport USB power adaptor 100 can continue to operate in a buck-bypass mode. When the current drawn on the USB ports 112A, 112B increases, the USB-PD subsystem 110 increases $V_{IN}$ to a higher voltage (limited by $I_{max}$) and operates the buck circuits 104A. 104B in variable-buck-input mode. In some embodiments, the current limitation occurs where the greatest target output voltage $V_{OUT\_C}$ is less than 15V. Where the target output voltage $V_{OUT\_C}$ is either 15V (optional) or 20V the USB-PD subsystem 110 can continue to operate in buck-bypass mode for the USB port(s) 112A, 112B requesting either 15V (optional) or 20V.

Figure 3:
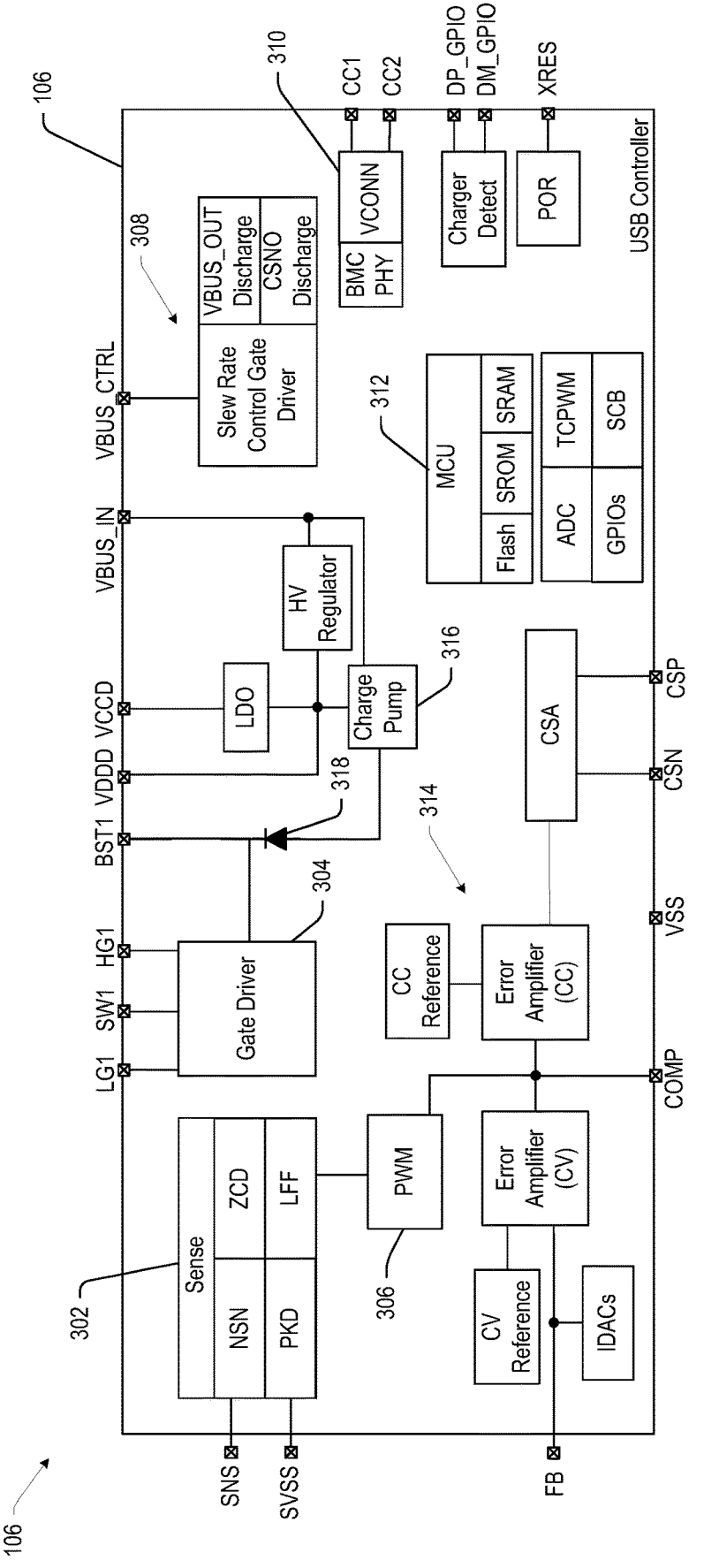
FIG. 3 is diagram of an on-chip, integrated circuit (IC) USB controller, in accordance with some embodiments.

FIG. 3 is a block diagram of the USB controller 106, according to some embodiments. The USB controller 106 includes a sense unit 302 and a gate driver 304 coupled to the gate node of the switching element 152 through a HG1 pin and coupled to the gate node of the switching element 154 through a LG1 pin. The sense unit 302 is coupled to the drain node of the switching element 152 through an SNS pin and through an SVSS pin to the source node of the switching element 152. The sense unit 302 includes a zero-crossing detector (ZCD) block to sense or detect a zero-crossing, a negative sense detection (NSN) block to sense negative voltage in the SNS pin, a line feed forward (LFF) block to sense a feed-forward operation, and a peak detector to detect peak voltages on the SNS pin. One or more outputs of the sense unit 302 are coupled to the gate driver 304 and to a pulse width modulation (PWM) circuit 306 to generate a switching signal for controlling the switching elements 152, 154.

The USB controller 106 further includes a secondary switch unit 308 including a slew rate control gate driver for driving the provider transistor 164, a low dropout (LDO) regulator, a high voltage (HV) regulator, a VBUS_C discharge circuit for discharging $V_{OUT\_C1}$, $V_{OUT\_C2}$, a and a CSNO discharge unit for discharging the VBUS_CTRL line.

An interface circuit 310 includes circuits or blocks for communicating with a device being powered or charged by the USB controller 106 to support various charging protocols. These circuits or blocks can include a VCONN block for repurposing a CC pin for powering electronics in a USB Type-C power delivery mode and a biphase mark code (BMC) and physical layer (PHY) to communicate with device using certain charging protocols and a charger detect block.

The USB controller 106 includes a microcontroller unit (MCU) subsystem 312 including logic and a microprocessor or controller for executing programs stored memory in the MCU subsystem, analog-to-digital converters (ADC), a multipurpose Timer Counter Pulse Width Modulator (TCPWM) capable of performing a multiple functions necessary for operation of the MCU, a number of general purpose input/outputs (GPIOs), and a serial communication bus (SCB).

The USB controller 106 includes a feedback circuit 314 coupled to the feedback pin to provide error correction to the PWM unit 306. In some embodiments, the feedback circuit 314 includes a constant-voltage (CV) reference, a constant current (CC) reference, one or more error amplifiers, such as a constant voltage (CV) error amplifier or a constant current (CC) error amplifier, inter-digital analog converters (IDACs), a current sense amplifier (CSA).

In bypass mode, the USB controller 106 maintains the on state of the switching element 152 and the off state of the switching element 154 to charge the output capacitor 158 with the input voltage $V_{IN}$ to generate the output voltage. In some embodiments, the on state of the switching element 152 is maintained by setting the PWM duty cycle in the PWM unit 306 to 100%. In some embodiments, a bootstrap circuit generates a bootstrap signal to maintain the on state of the switching element 152. In some embodiments, the bootstrap unit comprises a charge pump 316 and a diode 318.

Figure 4:
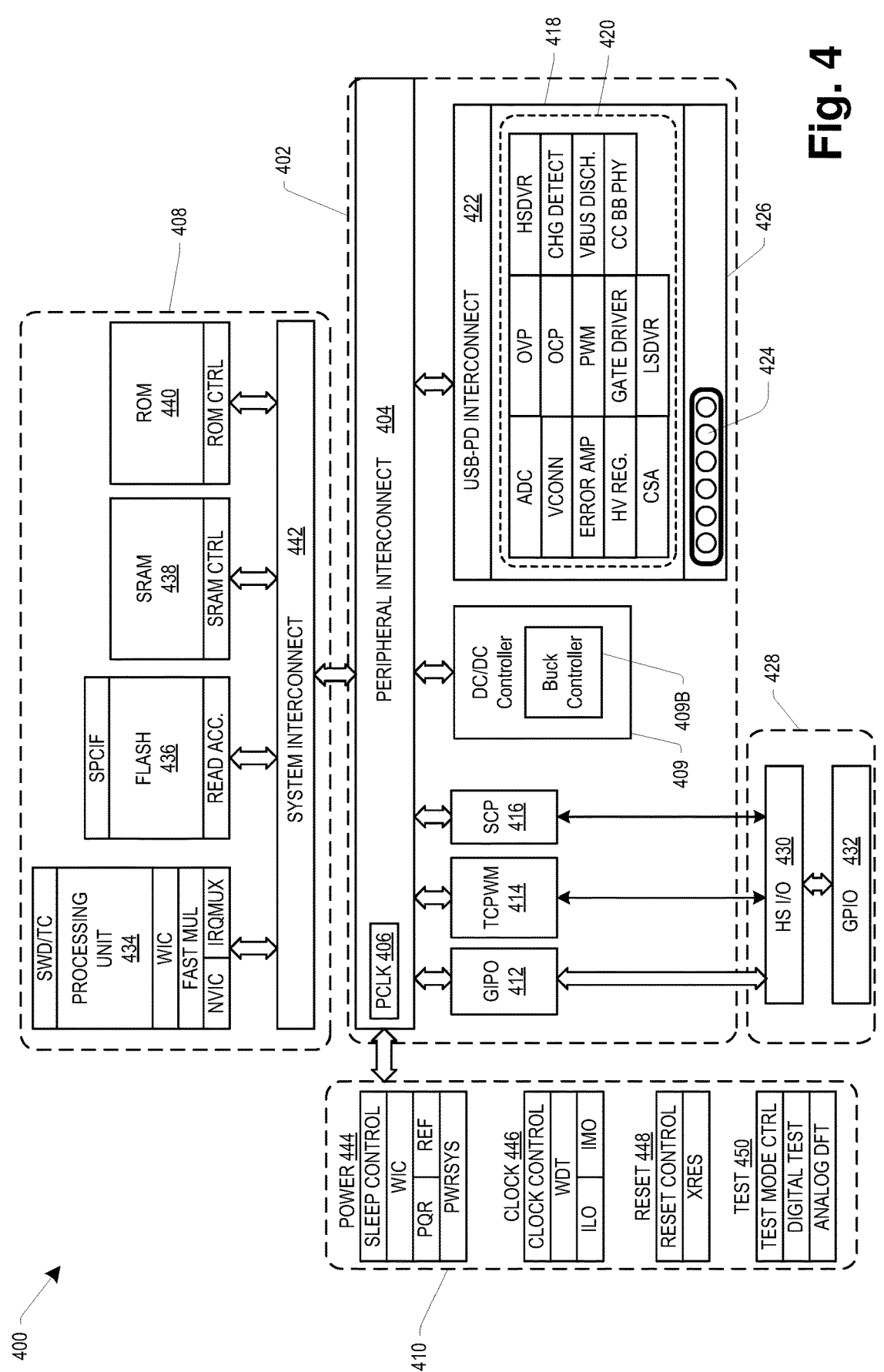
FIG. 4 is a block diagram illustrating a system 400 for a USB device, in accordance with some embodiments.

FIG. 4 is a block diagram illustrating a system 400 for a USB device, in accordance with some embodiments. In some embodiments, the system 400 comprises a peripheral subsystem 402, a peripheral interconnect 404, a CPU subsystem 408, a DC/DC-controller 409 including a buck controller 409B, and system resources 410. In some embodiments, peripheral subsystem 402 includes a number of components for use in the USB power delivery (USB-PD). The peripheral subsystem 402 may include the peripheral interconnect 404 including a peripheral clock module (PCLK) 406 for providing clock signals to the various components of the peripheral subsystem 402. The peripheral interconnect 404 may be a peripheral bus, such as a single level or Multi-level Advanced High Performance Bus (AHB), and can provide a data and control interface between the peripheral subsystem 402 and the CPU subsystem 408. The peripheral interconnect 404 may include controller circuitry, such as direct memory access (DMA) controllers, which may be programmed to transfer data between peripheral blocks without input from the CPU subsystem 408, without control of the CPU subsystem 408, or without stressing the same transfer.

The peripheral interconnect 404 may be used to couple the peripheral subsystem 402 components to other components of the system 400. A number of general purpose inputs/outputs (GPIOs) 412 may be coupled to the peripheral interconnect 404 for sending and receiving signals. The GPIOs 412 may include circuitry configured to implement various functions such as pull-up, pull-down, input threshold selection, input and output buffer enable/disable, single multiplexing, and so on. Other functions can also be implemented by the GPIOs 412. One or more timer/counter/pulse width modulators (TCPWM) 414 may also be coupled to the peripheral interconnect and may include circuitry to implement timing circuits (timers), counters, pulse width modulators (PWMs), decoders, and other digital functions associated with I/O signals work and can provide digital signals for system components of the system 400. The peripheral subsystem 402 may also include one or more Serial Communication Blocks (SCBs) 416 for implementing serial communication interfaces such as I2C, Serial Peripheral Interface (SPI), Universal Asynchronous Receiver/Transmitter (UART), Controller Area Network (CAN), CXPI (Clock Extension Peripheral Interface), etc.

For USB power delivery applications, the peripheral subsystem 402 may include a USB power delivery subsystem 418 coupled to the peripheral interconnect 404 and including a set of USB PD modules 420 for use with USB power delivery. The USB PD modules 420 may be coupled to the peripheral interconnect 404 by a USB-PD interconnect 422. The USB PD modules 420 may include: one or more analog-to-digital convertors (ADCs) for converting various analog signals to digital signals; a VCONN unit; an error amplifier (ERROR AMP) for controlling the power source voltage applied to the VBUS line per a PD contract; a high voltage regulator (HV REG) for converting the power supply voltage to the precise voltage (e.g., 3-5V) needed by the USB controller 106; a current sense amplifier (CSA); over-voltage protection (OVP) circuits; over-current protection (OCP) circuits; a pulse width modulator (PWM); one or more gate drivers (GATE DRIVER) for controlling the power switches that turn ON and off the provision of power over the VBUS line; a low-side gate driver (LSDR); a high-side gate driver (HSDR); a charging protocol detection block (CHG DET) to detect and support different types of proprietary charging standards; at least two on-die discharge (VBUS DISCH) circuits that can discharge a VBUS line voltage to any of range of programmable voltage levels; and a communication channel PHY (CC BB PHY) logic for supporting communications on a Type-C Communication Channel (CC), including requested $V_{OUT\_C}$ levels.

The USB power delivery subsystem 418 may also include pads 424 for external connections and Electrostatic Discharge (ESD) suppression circuitry 426 that may be required on a Type-C port. The USB PD modules 420 may also include a communication module for retrieving and transmitting information, such as control signals, such as from the USB controller 106 and the SR controller 128.

The GPIOs 412, the TCPWM 414, and the SCB 416 may be coupled to an input/output (I/O) subsystem 428, which may include a high-speed (HS) I/O matrix 430 connected to a number of GPIOs 432. The GPIOs 412, the TCPWM 414, and the SCB 416 may be coupled to the GPIOs 432 through the HS-I/O matrix 430.

The central processing unit (CPU) subsystem 408 is provided for processing instructions, storing program information and data. The CPU subsystem 408 may include one or more processing units 434 for executing instructions and reading from and writing to memory locations from a number of memories. The processing unit 434 may be a processor suitable for operation in an integrated circuit (IC) or system-on-chip (SOC) device. In some embodiments, the processing unit 434 may be optimized for low power operation with extensive clock gating. In this embodiment, different internal control circuits can be implemented for processing unit operation in different power states. For example, the processing unit 434 may include a single wire debug (SWD) module, a terminal count (TC) module, a wake-up interrupt controller (WIC) configured to wake up the processing unit from a sleep state, which may shut down power when the IC or SOC is in is in a sleep state, a fast multiplier, a nested vector interrupt controller (NVIC), and an interrupt multiplexer (IRQMUX). The CPU subsystem 408 may include one or more memories, including a flash memory 436, a static random access memory (SRAM) 438, and a read only memory (ROM) 440. The flash memory 436 may be non-volatile memory (NAND flash, NOR flash, etc.) configured to store data, programs, and/or other firmware instructions. The flash memory 436 may include system performance controller interface (SPCIF) registers and a read accelerator and, by being integrated into the CPU subsystem 408, improve access times. The SRAM 438 may be volatile memory configured to store data and firmware instructions accessible by the processing unit 434. The ROM 440 may be configured to store boot routines, configuration parameters, and other firmware parameters and settings that do not change during operation of the system 400. The SRAM 438 and the ROM 440 may have associated control circuitry. The processing unit 434 and the memory modules 436, 438, 440 may be coupled to a system interconnect 442 to route signals to and from the various components of the CPU subsystem 408 to other blocks or modules of the system 400. The system interconnect 442 can be implemented as a system bus, such as a single-level or multi-level AHB. The system interconnect 442 may be configured as an interface to couple the various components of the CPU subsystem 408 together. The system interconnect 442 may be coupled to the peripheral interconnect 404 to provide signal paths between the CPU subsystem 408 and components of the peripheral subsystem 402.

The system resources 410 may include a power module 444, a clock module 446, a reset module 448, and a test module 450. The power module 444 may include a sleep control module, a wake-up interrupt control (WIC) module, a power-on-reset (POR) module, a number of voltage references (REF), and a PWRSYS module. In some embodiments, the power module 444 may include circuitry that allows the system 400 to draw power from and/or provide power to external sources at different voltage and/or current levels and control operation in different power states, such as active, low power, or sleep. In various embodiments, more power states may be implemented as the system 400 throttles operation to achieve a desired power consumption or power output. For example, the secondary-side controller 104 can access secondary electrical parameters on the secondary side. The clock module 446 may include a clock control module, a watchdog timer (WDT), an internal low-speed oscillator (ILO), and an internal main oscillator (IMO). The reset module 448 may include a reset control module and an external reset module (XRES module). The test module 450 may include a module to control and enter a test mode, as well as test control modules for analog and digital functions (digital test and analog DFT).

The system 400 may be implemented in a monolithic (e.g., single) semiconductor die. In other embodiments, different parts or modules of the system 400 may be implemented on different semiconductor dies. For example, the memory modules 436, 438, 440 of the CPU subsystem 408 may be on-chip or off-chip. In still other embodiments, circuitry with separate dies can be packaged in a single "chip" or remain separate and arranged on a circuit board (or in a USB cable connector) as separate elements.

The system 400 can be implemented in a number of application contexts to provide USB PD functionality. In any application context, an electronic device (e.g., a USB-enabled device) may have an IC controller or SOC implementation embodied by the system 400 arranged and configured to perform operations according to the techniques described herein. In one embodiment, the system 400 may be arranged and configured in a personal computer (PC) power adapter for a laptop, notebook computer, and so on. In another embodiment, the system 400 may be housed in a power adapter (e.g., a wall charger) for a mobile electronic device (e.g. a smartphone, a tablet, etc.). In another embodiment, the system 400 may be placed and configured in a wall outlet configured to provide power via USB Type-A and/or Type-C port(s). In another embodiment, the system 400 may be arranged and configured in a car charger configured to provide power via USB Type-A and/or Type-C port(s). In yet another embodiment, the system 400 may be arranged and configured in a power bank that can be charged via a USB Type-A and/or Type-C port and then provide power to another electronic device. In other embodiments, a system such as the system 400, may be configured with the power switch gate control circuitry described herein and may be incorporated into various other USB-enabled electronic or electromechanical devices.

It should be understood that a system, such as the system 400, implemented on or as an IC controller, can be placed in various applications that vary in terms of the type of power source used and the direction in which power is supplied. For example, in the case of a car charger, the power source is a car battery that provides DC power, while in the case of a mobile power adapter, the power source is an AC wall outlet. Further, in the case of a PC power adapter, the flow of power input is from a provider device to a consumer device, while in the case of a power bank, the flow of power input can be in either direction, depending on whether the power bank is operating as a power provider (e.g., to power another device) or as a power consumer (e.g., to allow itself to be charged). For these reasons, the various applications of the system 400 should be considered in an illustrative rather than a limiting sense.

In an embodiment of the techniques presented herein, a universal serial bus power delivery (USB-PD) power adaptor comprises a first USB port, a flyback-converter operable to receive and convert a first voltage to a second voltage, a first buck circuit comprises a first switch connected between the flyback-converter and the first USB port, and a USB-PD controller connected to the flyback-converter and configured to receive a first target voltage for the first USB port, determine a value for the second voltage of the flyback converter, responsive to the first target voltage being less than the second voltage plus an offset voltage, operating the first buck circuit in a variable-buck-input mode to control the first switch according to a first duty cycle based on the first target voltage and the second voltage to generate the first target voltage at the first USB port, and responsive to the first target voltage being equal to the second voltage plus the offset voltage, operating the first buck circuit in a buck-bypass mode to maintain an on state of the first switch to generate the first target voltage at the first USB port.

In an embodiment of the techniques presented herein, the USB-PD power adaptor comprises a second USB port, and a second buck circuit comprises a second switch connected between the flyback-converter and the second USB port, wherein the USB-PD controller is configured to receive a second target voltage for the second USB port, determine the value for the second voltage of the flyback converter based on a greater of the first target voltage and the second target voltage, responsive to the second target voltage being less than the second voltage plus the offset voltage, operating the second buck circuit in a variable-buck-input mode to control the second switch according to a second duty cycle based on the second target voltage and the second voltage to generate the second target voltage at the second USB port, and responsive to the second target voltage being equal to the second voltage plus the offset voltage, operating the second buck circuit in a buck-bypass mode to maintain an on state of the second switch to generate the second target voltage at the second USB port.

In an embodiment of the techniques presented herein, the USB-PD controller comprises a bootstrap circuit connected to a gate input of the first switch to maintain the on state of the first switch in the buck-bypass mode.

In an embodiment of the techniques presented herein, the bootstrap circuit comprises a charge pump.

In an embodiment of the techniques presented herein, the USB-PD controller comprises a pulse width modulation (PWM) circuit connected to a gate input of the first switch to toggle the first switch according to the first duty cycle in the variable-buck-input mode and to maintain the on state of the first switch in the buck-bypass mode.

In an embodiment of the techniques presented herein, the first buck circuit comprises a second switch connected between the first USB port and ground, and the USB-PD controller is configured to maintain an off state of the second switch in the buck-bypass mode.

In an embodiment of the techniques presented herein, the first buck circuit comprises an inductor connected between the first switch and the first USB port, and the offset voltage depends on a voltage drop across the first switch and the inductor.

In an embodiment of the techniques presented herein, a method for operating a universal serial bus power delivery (USB-PD) power adaptor comprises operating a first buck circuit comprising a first switch connected between a supply voltage terminal and a first USB port based on a first target voltage for the first USB port and a supply voltage at the supply voltage terminal, responsive to the first target voltage being less than the supply voltage plus an offset voltage, operating the first buck circuit in a variable-buck-input mode to control the first switch according to a first duty cycle based on the first target voltage and the supply voltage to generate the first target voltage at the first USB port, and responsive to the first target voltage being equal to the supply voltage plus the offset voltage, operating the first buck circuit in a buck-bypass mode to maintain an on state of the first switch to generate the first target voltage at the first USB port.

In an embodiment of the techniques presented herein, the method comprises operating a second buck circuit comprises a second switch connected between the supply voltage terminal and a second USB port based on a second target voltage for the second USB port and the supply voltage at the supply voltage terminal, wherein responsive to the second target voltage being less than the supply voltage plus an offset voltage, operating the second buck circuit in a variable-buck-input mode to control the second switch according to a second duty cycle based on the second target voltage and the supply voltage to generate the second target voltage at the second USB port, and responsive to the second target voltage being equal to the supply voltage plus the offset voltage, operating the second buck circuit in a buck-bypass mode to maintain an on state of the second switch to generate the second target voltage at the second USB port.

In an embodiment of the techniques presented herein, the method comprises configuring a flyback converter to generate the supply voltage at the supply voltage terminal based on a greater of the first target voltage and the second target voltage.

In an embodiment of the techniques presented herein, the method comprises enabling a bootstrap circuit connected to a gate input of the first switch to maintain the on stage of the first switch in the buck-bypass mode.

In an embodiment of the techniques presented herein, enabling the bootstrap circuit comprises enabling a charge pump connected to the gate input of the first switch.

In an embodiment of the techniques presented herein, the method comprises configuring a pulse width modulation (PWM) circuit connected to a gate input of the first switch to toggle the first switch according to the first duty cycle in the variable-buck-input mode and to maintain the on state of the first switch in the buck-bypass mode.

In an embodiment of the techniques presented herein, the first buck circuit comprises a second switch connected between the first USB port and ground, and the method comprises maintaining an off state of the second switch in the buck-bypass mode.

In an embodiment of the techniques presented herein, the first buck circuit comprises an inductor connected between the first switch and the first USB port, and the method comprises configuring the offset voltage based on a voltage drop across the first switch and the inductor.

In an embodiment of the techniques presented herein, a universal serial bus power delivery (USB-PD) power adaptor comprises USB ports, a flyback-converter operable to receive and convert a first voltage to a second voltage, buck circuits connected between the flyback-converter and the USB ports, and a USB-PD controller connected to the flyback-converter and configured to receive target voltages for the USB ports, determine a value for the second voltage of the flyback converter based on a greatest of the target voltages, responsive to a target voltage for a first selected buck circuit of the buck circuits being less than the second voltage plus an offset voltage, operating the first selected buck circuit in a variable-buck-input mode according to a duty cycle based on the target voltage for the first selected buck circuit and the second voltage to generate the target voltage for the first selected buck circuit at a first USB port of the USB ports associated with the first selected buck circuit, and responsive to a target voltage for a second selected buck circuit of the buck circuits being less than the second voltage plus the offset voltage, operating the second selected buck circuit in a buck-bypass mode according to a duty cycle of 100% to generate the target voltage for the second selected buck circuit at a second USB port of the USB ports associated with the second selected buck circuit.

In an embodiment of the techniques presented herein, the first selected buck circuit comprises a switch, and the USB-PD controller is configured to control the switch based on the duty cycle.

In an embodiment of the techniques presented herein, the USB-PD controller comprises a bootstrap circuit connected to a gate input of the switch to maintain an on state of the switch in the buck-bypass mode.

In an embodiment of the techniques presented herein, the second selected buck circuit comprises a second switch, and the USB-PD controller comprises a pulse width modulation (PWM) circuit connected to a gate input of the second switch to toggle the second switch according to the duty cycle in the variable-buck-input mode.

In an embodiment of the techniques presented herein, the USB-PD controller comprises a pulse width modulation (PWM) circuit connected to a gate input of the switch to maintain an on state of the switch in the buck-bypass mode.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/ or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" and/or the like is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A universal serial bus power delivery (USB-PD) power adaptor comprising:

a first USB port;

a flyback-converter operable to receive and convert a first voltage to a second voltage;

a first buck circuit comprising a first switch connected between the flyback-converter and the first USB port; and a USB-PD controller connected to the flyback-converter and configured to:

receive one of a first target voltage or a second target voltage for the first USB port;

determine a value for the second voltage of the flyback converter;

responsive to the first target voltage being less than the second voltage plus an offset voltage, operating the first buck circuit in a variable-buck-input mode to control the first switch according to a first duty cycle based on the first target voltage and the second voltage to generate the first target voltage at the first USB port; and responsive to the second target voltage being equal to the second voltage plus the offset voltage, operating the first buck circuit in a buck-bypass mode to maintain an on state of the first switch to generate the second target voltage at the first USB port.

2. The USB-PD power adaptor of claim 1, comprising:

a second USB port; and a second buck circuit comprising a second switch connected between the flyback-converter and the second USB port, wherein:

the USB-PD controller is configured to:

receive a third target voltage for the second USB port;

determine the value for the second voltage of the flyback converter based on a greater of the first target voltage and the third target voltage;

responsive to the third target voltage being less than the second voltage plus the offset voltage, operating the second buck circuit in a variable-buck-input mode to control the second switch according to a second duty cycle based on the third target voltage and the second voltage to generate the third target voltage at the second USB port; and responsive to the second target voltage being equal to the second voltage plus the offset voltage, operating the second buck circuit in a buck-bypass mode to maintain an on state of the second switch to generate the third target voltage at the second USB port.

3. The USB-PD power adaptor of claim 1, wherein the USB-PD controller comprises:

a bootstrap circuit connected to a gate input of the first switch to maintain the on state of the first switch in the buck-bypass mode.

4. The USB-PD power adaptor of claim 3, wherein:

the bootstrap circuit comprises a charge pump.

5. The USB-PD power adaptor of claim 1, wherein the USB-PD controller comprises:

a pulse width modulation (PWM) circuit connected to a gate input of the first switch to toggle the first switch according to the first duty cycle in the variable-buck-input mode and to maintain the on state of the first switch in the buck-bypass mode.

6. The USB-PD power adaptor of claim 1, wherein:

the first buck circuit comprises a second switch connected between the first USB port and ground; and the USB-PD controller is configured to maintain an off state of the second switch in the buck-bypass mode.

7. The USB-PD power adaptor of claim 1, wherein:

the first buck circuit comprises an inductor connected between the first switch and the first USB port; and the offset voltage depends on a voltage drop across the first switch and the inductor.

8. A method for operating a universal serial bus power delivery (USB-PD) power adaptor comprising:

operating a first buck circuit comprising a first switch connected between a supply voltage terminal and a first USB port based on one of a first target voltage or a second target voltage for the first USB port and a supply voltage at the supply voltage terminal, wherein:

responsive to the first target voltage being less than the supply voltage plus an offset voltage, operating the first buck circuit in a variable-buck-input mode to control the first switch according to a first duty cycle based on the first target voltage and the supply voltage to generate the first target voltage at the first USB port; and responsive to the second target voltage being equal to the supply voltage plus the offset voltage, operating the first buck circuit in a buck-bypass mode to maintain an on state of the first switch to generate the second target voltage at the first USB port.

9. The method of claim 8, comprising:

operating a second buck circuit comprising a second switch connected between the supply voltage terminal and a second USB port based on a third target voltage for the second USB port and the supply voltage at the supply voltage terminal, wherein:

responsive to the third target voltage being less than the supply voltage plus an offset voltage, operating the second buck circuit in a variable-buck-input mode to control the second switch according to a second duty cycle based on the third target voltage and the supply voltage to generate the third target voltage at the second USB port; and responsive to the third target voltage being equal to the supply voltage plus the offset voltage, operating the second buck circuit in a buck-bypass mode to maintain an on state of the second switch to generate the third target voltage at the second USB port.

10. The method of claim 9, comprising:

configuring a flyback converter to generate the supply voltage at the supply voltage terminal based on a greater of the first target voltage and the third target voltage.

11. The method of claim 8, comprising:

enabling a bootstrap circuit connected to a gate input of the first switch to maintain the on stage of the first switch in the buck-bypass mode.

12. The method of claim 11, wherein:

enabling the bootstrap circuit comprises enabling a charge pump connected to the gate input of the first switch.

13. The method of claim 8, comprising:

configuring a pulse width modulation (PWM) circuit connected to a gate input of the first switch to toggle the first switch according to the first duty cycle in the variable-buck-input mode and to maintain the on state of the first switch in the buck-bypass mode.

14. The method of claim 8, wherein:

the first buck circuit comprises a second switch connected between the first USB port and ground; and the method comprises maintaining an off state of the second switch in the buck-bypass mode.

15. The method of claim 8, wherein:

the first buck circuit comprises an inductor connected between the first switch and the first USB port; and the method comprises configuring the offset voltage based on a voltage drop across the first switch and the inductor.

16. A universal serial bus power delivery (USB-PD) power adaptor comprising:

USB ports;

a flyback-converter operable to receive and convert a first voltage to a second voltage;

buck circuits connected between the flyback-converter and the USB ports; and a USB-PD controller connected to the flyback-converter and configured to:

receive target voltages for the USB ports;

determine a value for the second voltage of the flyback converter based on a greatest of the target voltages;

responsive to a first target voltage for a first selected buck circuit of the buck circuits being less than the second voltage plus an offset voltage, operating the first selected buck circuit in a variable-buck-input mode according to a duty cycle based on the first target voltage for the first selected buck circuit and the second voltage to generate the first target voltage for the first selected buck circuit at a first USB port of the USB ports associated with the first selected buck circuit; and responsive to a second target voltage for a second selected buck circuit of the buck circuits being less than the second voltage plus the offset voltage, operating the second selected buck circuit in a buck-bypass mode according to a duty cycle of 100% to generate the second target voltage for the second selected buck circuit at a second USB port of the USB ports associated with the second selected buck circuit.

17. The USB-PD power adaptor of claim 16, wherein:

the first selected buck circuit comprises a switch; and the USB-PD controller is configured to control the switch based on the duty cycle.

18. The USB-PD power adaptor of claim 17, wherein the USB-PD controller comprises:

a bootstrap circuit connected to a gate input of the switch to maintain an on state of the switch in the buck-bypass mode.

19. The USB-PD power adaptor of claim 17, wherein:

the second selected buck circuit comprises a second switch; and the USB-PD controller comprises a pulse width modulation (PWM) circuit connected to a gate input of the second switch to toggle the second switch according to the duty cycle in the variable-buck-input mode.

20. The USB-PD power adaptor of claim 17, wherein the USB-PD controller comprises:

a pulse width modulation (PWM) circuit connected to a gate input of the switch to maintain an on state of the switch in the buck-bypass mode.

* * * * *